Nov. 27, 1923.

S. C. CLINKSCALE

PLANT DIGGER

Filed Aug. 12, 1922

1,475,686

Inventor
S. C. Clinkscale

Watson E. Coleman
Attorney

Patented Nov. 27, 1923.

1,475,686

UNITED STATES PATENT OFFICE.

SAMUEL C. CLINKSCALE, OF BONITA, KANSAS.

PLANT DIGGER.

Application filed August 12, 1922. Serial No. 581,477.

*To all whom it may concern:*

Be it known that I, SAMUEL C. CLINKSCALE, a citizen of the United States, residing at Bonita, in the county of Johnson and State of Kansas, have invented certain new and useful Improvements in Plant Diggers, of which the following is a specification, reference being had to the accompanying drawings.

This invention relates to plant diggers, and has for its object to provide a device of this character capable of being easily operated to remove weeds and undesirable vegetation, especially dandelions, from the soil.

It is another object of the invention to provide a device of this character including a member adapted to encase the plant to be removed, and having a passage through which the plant passes upon insertion of the device in the ground.

It is a further object of the invention to provide a device of this character including a handle, positioned so as not to interfere with the passage of plants through the device in the plant removing operation.

With these and other objects in view, the invention consists in the improved construction and arrangement of parts to be hereinafter more particularly described, fully claimed and illustrated in the accompanying drawings, in which:—

Figure 1:
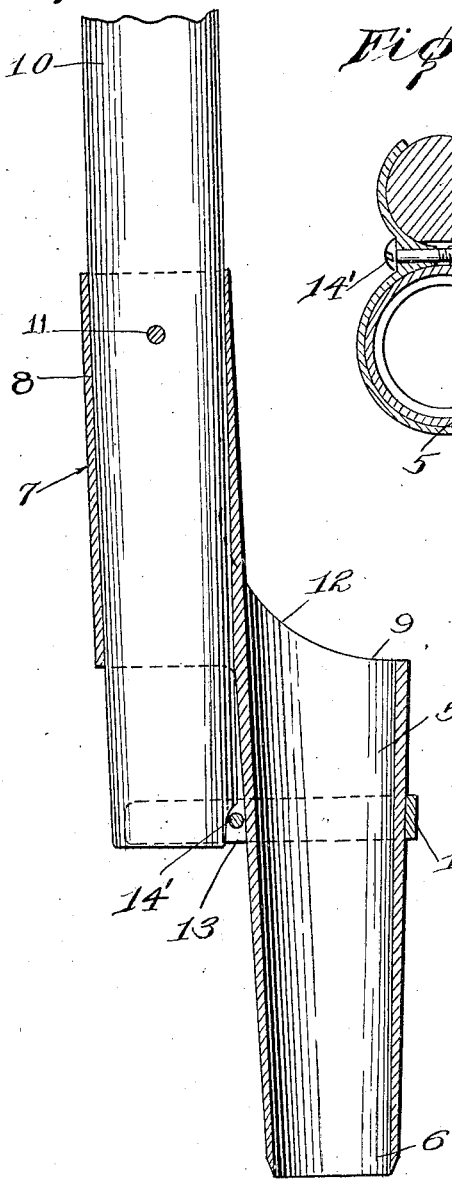
Figure 1 is a longitudinal sectional view of a plant digger constructed in accordance with an embodiment of the invention.
Figure 2:
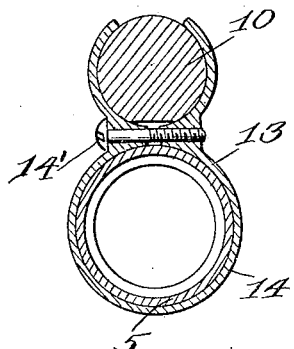
Figure 2 is a front elevation.
Figure 3:
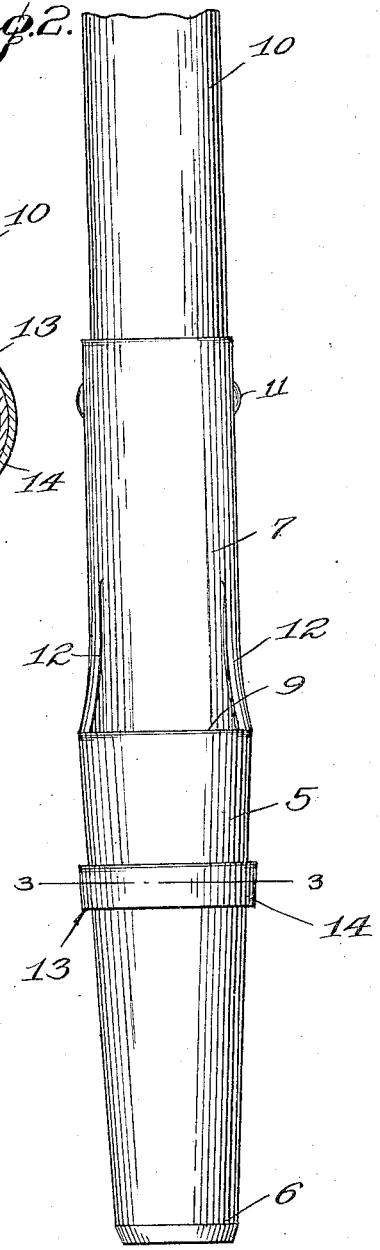
Figure 3 is a transverse sectional view of the structure shown in Figure 2.

Referring to the drawings, 5 designates a tubular body member. Said body member may be made in various lengths and sizes to accommodate the particular type of plant to be removed. The tubular body member is tapered longitudinally, the smaller end portion 6 having its outer edge sharpened so as to permit easy penetration of the ground. The body member 5 is intended to be placed over the plant and extended into the ground around the roots of the plant, and when removed carries the plant with it.

In order to permit the device to be conveniently used by the operator, without requiring the operator to assume an uncomfortable position, there is provided a novel form of socket member 7, the wall 8 of said socket member being formed integral with a portion of the wall of the body member 5. By this means the entire socket is disposed in offset relation to the body member 5, so that the upper open end 9 of the body member is unobstructed, thus permitting free passage of the plants through said member.

A handle member 10 is disposed in the socket member 7, suitable holes being provided in the extensions of the wall 8 for the reception of bolts, screws or like fastening devices, such as the rivet 11, by means of which the handle is secured in the socket. The socket is arranged so that the end of the handle projects therethrough adjacent the body member 5, the purpose of which will be hereinafter described.

In order to strengthen the connection of the wall 8 with the body member, reinforcing ribs 12 are formed integral with the wall 8 of the socket member and the end portion 9 of the tubular member, so that considerable pressure may be applied to the device without danger of the handle breaking off.

To further insure the socket against breakage, or bending, a double clamp member 13 is provided, the clamping arms 14 at one end of the clamp being adapted to engage the upper end portion of the tubular member 5, while the clamping arms at the opposite end of the clamp are adapted to engage the lower projecting end of the handle. Fastening means 14' extend through the central portion of the clamp to simultaneously urge the arms of the clamp in engagement with the tubular member and the end of the handle. It is of course obvious that the handle 10 may be made as long or as short as desired, as the length of the handle does not interfere with the operation of the device.

When it is desired to remove vegetation, such as dandelion plants, from a lawn, the handle member is grasped by the operator and the tubular member 5 placed over the plant. Pressure is then applied to the body portion 5 by the hand so as to cause penetration of the ground by the sharpened end portion 6 of the tubular member. In view of the fact that the body member 5 is longitudinally tapered, downward movement of the body member will permit the plant to readily enter the tubular body portion 5 and into the wide end portion 9 of said body member. Continued movement will cause the plant to be projected through the open end 9 of the body member substantially parallel to the handle socket 7. The device may then be removed from the ground and the plant ejected from the tubular member 5. Another advantage of the tapered portion 5 is that in view of the fact that the narrow end of the tapered portion is disposed downwardly, the soil within the body member will naturally spread, as the device is being forced into the ground, thereby preventing passage of the soil through the narrow end portion 6 of the body member 5. As the socket 7 is disposed in offset relation to the body member 5 there is nothing to interfere with the passage of the plant through said body member, regardless of the length of the plant. In addition to this, it permits the operator to ascertain whether the tool is directly over the plant.

From the foregoing it will be readily seen that this invention provides a novel form of plant digger capable of being used for the removal of all kinds of vegetation from a lawn without requiring the operator to stoop. In addition to this its simplicity permits it to be manufactured in large numbers from inexpensive material, and as there are no movable parts, the device will last indefinitely.

What is claimed is:—

1. A plant digger comprising a tubular body member, one end portion of said body member being longitudinally tapered and adapted to penetrate the ground, the opposite end portion of the body member having its walls extended outwardly and toward each other in offset relation to the first mentioned end portion of the body member to provide a socket for the reception of the handle.

2. A plant digger comprising a tubular body member having one end portion thereof longitudinally tapered for the reception of a plant, the opposite end portion of the body member being substantially offset and formed into a socket, a handle disposed within said socket, the end of said handle projecting beyond the lower end of the socket in parallel relation to the tapered end portion of the body member, means for securing the handle within the socket, and a clamp carried by the tapered portion of the body member and arranged to engage the end of the handle to brace the socket member with respect to the tapered body portion.

In testimony whereof I hereunto affix my signature.

SAMUEL C. CLINKSCALE.